US009235557B2

(12) United States Patent
Raichelgauz et al.

(10) Patent No.: US 9,235,557 B2
(45) Date of Patent: Jan. 12, 2016

(54) SYSTEM AND METHOD THEREOF FOR DYNAMICALLY ASSOCIATING A LINK TO AN INFORMATION RESOURCE WITH A MULTIMEDIA CONTENT DISPLAYED IN A WEB-PAGE

(71) Applicant: Cortica, Ltd., Tirat Carmel, IL (US)

(72) Inventors: Igal Raichelgauz, Herzelia (IL); Karina Odinaev, Haifa (IL); Yehoshua Y. Zeevi, Haifa (IL)

(73) Assignee: Cortica, Ltd., Tel Aviv (IL)

(*) Notice: Subject to any disclaimer, the term of this patent is extended or adjusted under 35 U.S.C. 154(b) by 208 days.

(21) Appl. No.: 13/685,182

(22) Filed: Nov. 26, 2012

(65) Prior Publication Data

US 2013/0080868 A1 Mar. 28, 2013

Related U.S. Application Data

(63) Continuation-in-part of application No. 13/624,397, filed on Sep. 21, 2012, and a continuation-in-part of application No. 13/344,400, filed on Jan. 5, 2012, now Pat. No. 8,959,037, which is a continuation of (Continued)

(51) Int. Cl.

| | |
|---|---|
| ***G06N 5/02*** | (2006.01) |
| ***G06F 17/30*** | (2006.01) |

(Continued)

(52) U.S. Cl.

CPC ...... *G06F 17/2235* (2013.01); *G06F 17/30882* (2013.01); *H04H 20/103* (2013.01); *H04H 60/37* (2013.01); *H04H 60/66* (2013.01); *H04N 7/17318* (2013.01); *H04N 21/25891* (2013.01); *H04N 21/2668* (2013.01); *H04N 21/466* (2013.01); *H04N 21/8106* (2013.01); *G06N 5/02* (2013.01)

(58) Field of Classification Search

CPC .................................. G06Q 30/0251–30/0271

See application file for complete search history.

(56) References Cited

U.S. PATENT DOCUMENTS

| | | | |
|---|---|---|---|
| 4,972,363 | A | 11/1990 | Nguyen et al. |
| 5,978,754 | A | 11/1999 | Kumano |

(Continued)

FOREIGN PATENT DOCUMENTS

| | | |
|---|---|---|
| WO | 02/31764 | 4/2002 |
| WO | 2007/0049282 | 5/2007 |

OTHER PUBLICATIONS

Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.

(Continued)

*Primary Examiner* — Stanley K Hill

(74) *Attorney, Agent, or Firm* — M&B IP Analysts, LLC

(57) ABSTRACT

A method for associating at least a link to an information resource with a multimedia content element. The method comprises identifying at least one multimedia content element in a web-page, wherein a uniform resource locator (URL) of the web-page is received from any one of a user device and a web server hosting the web-page; generating a signature for at least a portion of the at least one identified multimedia content element; determining at least a link to the at least a portion of the content respective of the generated signature; and providing the web-page with the at least a link respective of the signature of the at least a portion of the at least one multimedia content element to the user device.

14 Claims, 5 Drawing Sheets

Related U.S. Application Data application No. 12/434,221, filed on May 1, 2009, now Pat. No. 8,112,376, application No. 13/685,182, which is a continuation-in-part of application No. 12/084, 150, filed as application No. PCT/IL2006/001235 on Oct. 26, 2006, now Pat. No. 8,655,801, application No. 13/685,182, which is a continuation-in-part of application No. 12/195,863, filed on Aug. 21, 2008, now Pat. No. 8,326,775, which is a continuation-in-part of application No. 12/084,150.

(51) Int. Cl.

| | |
|---|---|
| ***G06K 9/36*** | (2006.01) |
| ***G06F 17/22*** | (2006.01) |
| ***H04H 20/10*** | (2008.01) |
| ***H04H 60/37*** | (2008.01) |
| ***H04H 60/66*** | (2008.01) |
| ***H04N 7/173*** | (2011.01) |
| ***H04N 21/258*** | (2011.01) |
| ***H04N 21/2668*** | (2011.01) |
| ***H04N 21/466*** | (2011.01) |
| ***H04N 21/81*** | (2011.01) |

(56) References Cited

U.S. PATENT DOCUMENTS

| | | | | |
|---|---|---|---|---|
| 6,052,481 | A | 4/2000 | Grajski et al. | |
| 6,076,088 | A | 6/2000 | Paik et al. | |
| 6,122,628 | A | 9/2000 | Castelli et al. | |
| 6,128,651 | A | 10/2000 | Cezar | |
| 6,243,375 | B1 | 6/2001 | Speicher | |
| 6,381,656 | B1 | 4/2002 | Shankman | |
| 6,422,617 | B1 | 7/2002 | Fukumoto et al. | |
| 6,611,628 | B1 | 8/2003 | Sekiguchi et al. | |
| 6,618,711 | B1 | 9/2003 | Ananth | |
| 6,643,620 | B1 | 11/2003 | Contolini et al. | |
| 6,643,643 | B1 | 11/2003 | Lee et al. | |
| 6,665,657 | B1 | 12/2003 | Dibachi | |
| 6,751,613 | B1 | 6/2004 | Lee et al. | |
| 6,754,435 | B2 | 6/2004 | Kim | |
| 6,763,519 | B1 | 7/2004 | McColl et al. | |
| 6,804,356 | B1 | 10/2004 | Krishnamachari | |
| 6,819,797 | B1 | 11/2004 | Smith et al. | |
| 6,901,207 | B1 | 5/2005 | Watkins | |
| 7,006,689 | B2 | 2/2006 | Kasutani | |
| 7,013,051 | B2 | 3/2006 | Sekiguchi et al. | |
| 7,020,654 | B1 | 3/2006 | Najmi | |
| 7,047,033 | B2 | 5/2006 | Wyler | |
| 7,260,564 | B1 | 8/2007 | Lynn et al. | |
| 7,302,117 | B2 | 11/2007 | Sekiguchi et al. | |
| 7,313,805 | B1 | 12/2007 | Rosin et al. | |
| 7,340,458 | B2 | 3/2008 | Vaithilingam et al. | |
| 7,353,224 | B2 | 4/2008 | Chen et al. | |
| 7,376,672 | B2 | 5/2008 | Weare | |
| 7,376,722 | B1 | 5/2008 | Sim et al. | |
| 7,433,895 | B2 | 10/2008 | Li et al. | |
| 7,464,086 | B2 | 12/2008 | Black et al. | |
| 7,526,607 | B1 | 4/2009 | Singh et al. | |
| 7,536,417 | B2 | 5/2009 | Walsh et al. | |
| 7,574,668 | B2 | 8/2009 | Nunez et al. | |
| 7,660,737 | B1 | 2/2010 | Lim et al. | |
| 7,694,318 | B2 * | 4/2010 | Konig et al. | 725/32 |
| 7,697,791 | B1 | 4/2010 | Chan et al. | |
| 7,769,221 | B1 | 8/2010 | Shakes et al. | |
| 7,788,132 | B2 | 8/2010 | Desikan et al. | |
| 7,860,895 | B1 | 12/2010 | Scofield et al. | |
| 7,904,503 | B2 | 3/2011 | Van De Sluis | |
| 7,920,894 | B2 | 4/2011 | Wyler | |
| 7,921,107 | B2 | 4/2011 | Chang et al. | |
| 7,974,994 | B2 | 7/2011 | Li et al. | |
| 7,987,194 | B1 | 7/2011 | Walker et al. | |
| 7,991,715 | B2 | 8/2011 | Schiff et al. | |
| 8,000,655 | B2 | 8/2011 | Wang et al. | |
| 8,098,934 | B2 | 1/2012 | Vincent et al. | |
| 8,266,185 | B2 | 9/2012 | Raichelgauz et al. | |
| 8,312,031 | B2 | 11/2012 | Raichelgauz et al. | |
| 8,316,005 | B2 | 11/2012 | Moore | |
| 8,677,377 | B2 | 3/2014 | Cheyer et al. | |
| 8,682,667 | B2 | 3/2014 | Haughay | |
| 8,688,446 | B2 | 4/2014 | Yanagihara | |
| 8,706,503 | B2 | 4/2014 | Cheyer et al. | |
| 8,775,442 | B2 | 7/2014 | Moore et al. | |
| 8,868,619 | B2 | 10/2014 | Raichelgauz et al. | |
| 8,898,568 | B2 | 11/2014 | Bull et al. | |
| 9,031,999 | B2 | 5/2015 | Raichelgauz et al. | |
| 2001/0019633 | A1 | 9/2001 | Tenze et al. | |
| 2001/0056427 | A1 | 12/2001 | Yoon et al. | |
| 2002/0107827 | A1 | 8/2002 | Benitez-Jimenez et al. | |
| 2002/0123928 | A1 | 9/2002 | Eldering et al. | |
| 2003/0028660 | A1 | 2/2003 | Igawa et al. | |
| 2003/0041047 | A1 | 2/2003 | Chang et al. | |
| 2003/0078766 | A1 | 4/2003 | Appelt et al. | |
| 2003/0191764 | A1 | 10/2003 | Richards | |
| 2004/0068510 | A1 | 4/2004 | Hayes et al. | |
| 2004/0107181 | A1 | 6/2004 | Rodden | |
| 2004/0111465 | A1 | 6/2004 | Chuang et al. | |
| 2004/0128142 | A1 | 7/2004 | Whitham | |
| 2004/0128511 | A1 | 7/2004 | Sun et al. | |
| 2004/0153426 | A1 | 8/2004 | Nugent | |
| 2004/0249779 | A1 | 12/2004 | Nauck et al. | |
| 2005/0177372 | A1 | 8/2005 | Wang et al. | |
| 2006/0026203 | A1 | 2/2006 | Tan et al. | |
| 2006/0031216 | A1 | 2/2006 | Semple et al. | |
| 2006/0153296 | A1 | 7/2006 | Deng | |
| 2006/0173688 | A1 | 8/2006 | Whitham | |
| 2006/0204035 | A1 | 9/2006 | Guo et al. | |
| 2006/0236343 | A1 | 10/2006 | Chang | |
| 2006/0242139 | A1 | 10/2006 | Butterfield et al. | |
| 2006/0242554 | A1 | 10/2006 | Gerace et al. | |
| 2006/0248558 | A1 | 11/2006 | Barton et al. | |
| 2006/0253423 | A1 | 11/2006 | McLane et al. | |
| 2007/0074147 | A1 | 3/2007 | Wold | |
| 2007/0130159 | A1 | 6/2007 | Gulli et al. | |
| 2007/0195987 | A1 | 8/2007 | Rhoads | |
| 2007/0220573 | A1 | 9/2007 | Chiussi et al. | |
| 2007/0244902 | A1 | 10/2007 | Seide et al. | |
| 2007/0253594 | A1 | 11/2007 | Lu et al. | |
| 2007/0294295 | A1 | 12/2007 | Finkelstein et al. | |
| 2008/0040277 | A1 | 2/2008 | DeWitt | |
| 2008/0049629 | A1 | 2/2008 | Morrill | |
| 2008/0072256 | A1 | 3/2008 | Boicey et al. | |
| 2008/0163288 | A1 | 7/2008 | Ghosal et al. | |
| 2008/0201299 | A1 | 8/2008 | Lehikoinen et al. | |
| 2008/0201314 | A1 | 8/2008 | Smith et al. | |
| 2008/0204706 | A1 | 8/2008 | Magne et al. | |
| 2008/0270373 | A1 | 10/2008 | Oostveen et al. | |
| 2008/0313140 | A1 | 12/2008 | Pereira et al. | |
| 2009/0013414 | A1 | 1/2009 | Washington et al. | |
| 2009/0089587 | A1 | 4/2009 | Brunk et al. | |
| 2009/0119157 | A1 | 5/2009 | Dulepet | |
| 2009/0125529 | A1 | 5/2009 | Vydiswaran et al. | |
| 2009/0148045 | A1 | 6/2009 | Lee et al. | |
| 2009/0172030 | A1 | 7/2009 | Schiff et al. | |
| 2009/0175538 | A1 * | 7/2009 | Bronstein et al. | 382/173 |
| 2009/0204511 | A1 | 8/2009 | Tsang | |
| 2009/0216639 | A1 | 8/2009 | Kapczynski et al. | |
| 2009/0245603 | A1 | 10/2009 | Koruga et al. | |
| 2009/0253583 | A1 | 10/2009 | Yoganathan | |
| 2009/0277322 | A1 | 11/2009 | Cai et al. | |
| 2010/0023400 | A1 | 1/2010 | Dewitt | |
| 2010/0082684 | A1 | 4/2010 | Churchill et al. | |
| 2010/0088321 | A1 | 4/2010 | Solomon et al. | |
| 2010/0104184 | A1 * | 4/2010 | Bronstein et al. | 382/170 |
| 2010/0106857 | A1 | 4/2010 | Wyler | |
| 2010/0191567 | A1 | 7/2010 | Lee et al. | |
| 2010/0268524 | A1 | 10/2010 | Nath et al. | |
| 2010/0318493 | A1 | 12/2010 | Wessling | |
| 2010/0322522 | A1 | 12/2010 | Wang et al. | |
| 2011/0035289 | A1 | 2/2011 | King et al. | |
| 2011/0106782 | A1 | 5/2011 | Ke et al. | |
| 2011/0145068 | A1 | 6/2011 | King et al. | |
| 2011/0202848 | A1 | 8/2011 | Ismalon | |

(56) References Cited

U.S. PATENT DOCUMENTS

| | | | | |
|---|---|---|---|---|
| 2011/0208822 | A1 | 8/2011 | Rathod | |
| 2011/0251896 | A1* | 10/2011 | Impollonia et al. | 705/14.55 |
| 2011/0313856 | A1* | 12/2011 | Cohen et al. | 705/14.49 |
| 2012/0167133 | A1* | 6/2012 | Carroll et al. | 725/32 |
| 2012/0330869 | A1 | 12/2012 | Durham | |
| 2013/0325550 | A1 | 12/2013 | Varghese et al. | |
| 2013/0332951 | A1* | 12/2013 | Gharaat et al. | 725/19 |
| 2014/0019264 | A1 | 1/2014 | Wachman et al. | |

OTHER PUBLICATIONS

Zhou et al., "Medical Diagnosis With C4.5 Rule Preceded by Artificial Neural Network Ensemble"; IEEE Transactions on Information Technology in Biomedicine, Volume: 7, Issue: 1, pp. 37-42, Date of Publication: Mar. 2003.

Cernansky et al., "Feed-forward Echo State Networks"; Proceedings of International Joint Conference on Neural Networks, Montreal, Canada, Jul. 31-Aug. 4, 2005.

Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.

Freisleben et al., "Recognition of Fractal Images Using a Neural Network", Lecture Notes in Computer Science, 1993, vol. 6861, 1993, pp. 631-637.

Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.

Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.

Fathy et al., "A Parallel Design and Implementation for Backpropagation Neural Network Using NIMD Architecture", 8th Mediterranean Electrotechnical Corsfe rersce, 19'96. Melecon '96, Date of Conference: May 13-16, 1996, vol. 3, pp. 1472-1475.

Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.

Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.

IPO Examination Report under Section 18(3) for corresponding UK application No. GB1001219.3, dated May 30, 2012.

IPO Examination Report under Section 18(3) for corresponding UK application No. GB1001219.3, dated Sep. 12, 2011.

Lin, C.; Chang, S.: "Generating Robust Digital Signature for ImageNideo Authentication", Multimedia and Security Workshop at ACM Mutlimedia '98; Bristol, U.K., Sep. 1998; pp. 49-54.

Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.

Maass, W. et al.: "Computational Models for Generic Cortical Microcircuits", Institute for Theoretical Computer Science, Technische Universitaet Graz, Graz, Austria, published Jun. 10, 2003.

International Search Report for the corresponding International Patent Application PCT/IL2006/001235; Date of Mailing: Nov. 2, 2008.

Raichelgauz, I. et al.: "Co-evolutionary Learning in Liquid Architectures", Lecture Notes in Computer Science, [Online] vol. 3512, Jun. 21, 2005, pp. 241-248, XP019010280 Springer Berlin/Heidelberg ISSN: 1611-3349 ISBN: 978-3-540-26208-4.

Jaeger, H.: "The "echo state" approach to analysing and training recurrent neural networks", GMD Report, No. 148, 2001, pp. 1-43, XP002466251. German National Research Center for Information Technology.

Verstraeten et al.: "Isolated word recognition with the Liquid State Machine: a case study", Information Processing Letters, Amsterdam, NL, vol. 95, No. 6, Sep. 30, 2005, pp. 521-528, XP005028093 ISSN: 0020-0190.

Zeevi, Y. et al.: "Natural Signal Classification by Neural Cliques and Phase-Locked Attractors", IEEE World Congress on Computational Intelligence, IJCNN2006, Vancouver, Canada, Jul. 2006, XP002466252.

Natsclager, T. et al.: "The "liquid computer": A novel strategy for real-time computing on time series", Special Issue on Foundations of Information Processing of Telematik, vol. 8, No. 1, 2002, pp. 39-43, XP002466253.

Morad, T.Y. et al.: "Performance, Power Efficiency and Scalability of Asymmetric Cluster Chip Multiprocessors", Computer Architecture Letters, vol. 4, Jul. 4, 2005, pp. 1-4, XP002466254.

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

International Search Authority: "Written Opinion of the International Searching Authority" (PCT Rule 43bis.1) including International Search Report for International Patent Application No. PCT/US2008/073852; Date of Mailing: Jan. 28, 2009.

Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.

International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; Date of Issuance: Jul. 28, 2009.

Boari et al, "Adaptive Routing for Dynamic Applications in Massively Parallel Architectures", 1995 IEEE, Spring 1995.

Cococcioni, et al, "Automatic Diagnosis of Defects of Rolling Element Bearings Based on Computational Intelligence Techniques", University of Pisa, Pisa, Italy, 2009.

Emami, et al, "Role of Spatiotemporal Oriented Energy Features for Robust Visual Tracking in Video Surveillance, University of Queensland", St. Lucia, Australia, 2012.

Foote, Jonathan et al., "Content-Based Retrieval of Music and Audio"; 1997, Institute of Systems Science, National University of Singapore, Singapore (ABSTRACT).

Garcia, "Solving the Weighted Region Least Cost Path Problem Using Transputers", Naval Postgraduate School, Monterey, California, Dec. 1989.

Guo et al, "AdOn: An Intelligent Overlay Video Advertising System", SIGIR, Boston, Massachusetts, Jul. 19-23, 2009.

Mandhaoui, et al, "Emotional Speech Characterization Based on Multi-Features Fusion for Face-to-Face Interaction", Universite Pierre et Marie Curie, Paris, France, 2009.

Marti, et al, "Real Time Speaker Localization and Detection System for Camera Steering in Multiparticipant Videoconferencing Environments", Universidad Politecnica de Valencia, Spain, 2011.

Mei, et al., "Contextual In-Image Advertising", Microsoft Research Asia, pp. 439-448, 2008.

Mei, et al., "VideoSense—Towards Effective Online Video Advertising", Microsoft Research Asia, pp. 1075-1084, 2007.

Nagy et al, "A Transputer, Based, Flexible, Real-Time Control System for Robotic Manipulators", UKACC International Conference on Control '96, Sep. 2-5, 1996, Conference 1996, Conference Publication No. 427, IEE 1996.

Ribert et al. "An Incremental Hierarchical Clustering", Visicon Interface 1999, pp. 586-591.

Scheper et al, "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.

(56) References Cited

OTHER PUBLICATIONS

Semizarov et al. "Specificity of Short Interfering RNA Determined through Gene Expression Signatures", PNAS, 2003, pp. 6347-6352.

Theodoropoulos et al, "Simulating Asynchronous Architectures on Transputer Networks", Proceedings of the Fourth Euromicro Workshop on Parallel and Distributed Processing, 1996. PDP '96.

* cited by examiner

SYSTEM AND METHOD THEREOF FOR DYNAMICALLY ASSOCIATING A LINK TO AN INFORMATION RESOURCE WITH A MULTIMEDIA CONTENT DISPLAYED IN A WEB-PAGE

CROSS-REFERENCE TO RELATED APPLICATIONS

This application is a continuation-in-part (CIP) of:

(a) U.S. patent application Ser. No. 13/624,397 filed on Sep. 21, 2012, now pending;

(b) U.S. patent application Ser. No. 13/344,400 filed on Jan. 5, 2012, now pending, which is a continuation of U.S. patent application Ser. No. 12/434,221, filed May 1, 2009, now U.S. Pat. No. 8,112,376;

(c) U.S. patent application Ser. No. 12/084,150 filed on Apr. 25, 2008, now pending, which is the National Stage of International Application No. PCT/IL2006/001235, filed on Oct. 26, 2006, which claims foreign priority from Israeli Application No. 171577 filed on Oct. 26, 2005 and Israeli Application No. 173409 filed on 29 Jan. 2006; and, (d) U.S. patent application Ser. No. 12/195,863, filed Aug. 21, 2008, now allowed, which claims priority under 35 USC 119 from Israeli Application No. 185414, filed on Aug. 21, 2007, and which is also a continuation-in-part of the above-referenced U.S. patent application Ser. No. 12/084,150.

All of the applications referenced above are herein incorporated by reference for all that they contain.

TECHNICAL FIELD

The present invention relates generally to the analysis of multimedia content, and more specifically to a system for providing links of information to multimedia content displayed as part of a web-page.

BACKGROUND

The Internet, also referred to as the worldwide web (WWW), has become a mass media where the content presentation is largely supported by paid advertisements that are added to the web-page content. Typically, advertisements are displayed using portions of code written in, for example, hyper-text mark-up language (HTML) or JavaScript that is inserted into, or otherwise called up by documents also written in HTML and which are sent to a user node for display. A web-page typically contains text and multimedia elements that are intended for display on the user's display device.

One of the most common types of advertisements on the Internet is in a form of a banner advertisement. Banner advertisements are generally images or animations that are displayed within a web-page. Other advertisements are simply inserted at various locations within the display area of the document. A typical web-page displayed today is cluttered with many advertisements, which frequently are irrelevant to the content being displayed, and as a result the user's attention is not given to them. Consequently, the advertising price of potentially valuable display area is low because its respective effectiveness is low.

It would therefore be advantageous to provide a solution that would overcome the deficiencies of the prior art by matching an advertisement to an already existing image.

SUMMARY

Certain embodiments disclosed herein include a system and method for associating at least a link to an information resource with a multimedia content element. The method comprises identifying at least one multimedia content element in a web-page, wherein a uniform resource locator (URL) of the web-page is received from any one of a user device and a web server hosting the web-page; generating a signature for at least a portion of the at least one identified multimedia content element; determining at least a link to the at least a portion of the content respective of the generated signature; and providing the web-page with the at least a link respective of the signature of the at least a portion of the at least one multimedia content element to the user device.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
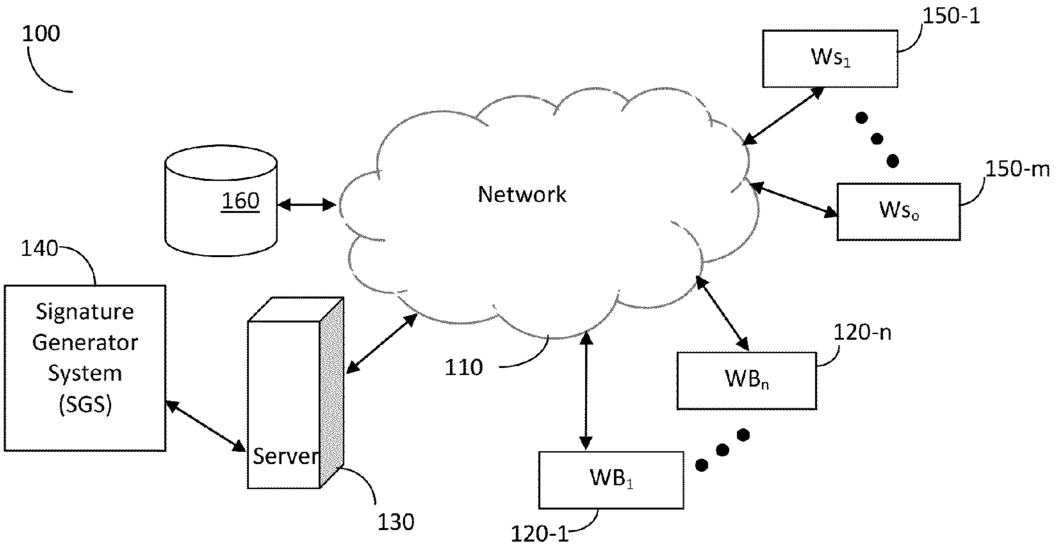
FIG. 1 is a schematic block diagram of a system for processing multimedia content displayed on a web-page according to an embodiment.

It is important to note that the embodiments disclosed herein are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows an exemplary and non-limiting schematic diagram of a system 100 for providing advertisements for matching multimedia content displayed in a web-page in accordance with one embodiment. A network 110 is used to communicate between different parts of the system. The network 110 may be the Internet, the world-wide-web (WWW), a local area network (LAN), a wide area network (WAN), a metro area network (MAN), and other networks capable of enabling communication between the elements of the system 100.

Further connected to the network 110 are one or more client applications, such as web browsers (WB) 120-1 through **120-*n* (collectively referred to hereinafter as web browsers 120 or individually as a web browser 120, merely for simplicity purposes). A web browser 120** is executed over a computing device including, for example, a personal computer (PC), a personal digital assistant (PDA), a mobile phone, a smart phone, a tablet computer, and other kinds of wired and mobile appliances, equipped with browsing, viewing, listening, filtering, and managing capabilities, etc., that are enabled as further discussed herein below.

A server 130 is further connected to the network 110 and may provide to a web browser 120 web-pages containing multimedia content, or references therein, such that upon request by a web browser, such multimedia content is provided to the web browser 120. The system 100 also includes a signature generator system (SGS) 140. In one embodiment, the SGS 140 is connected to the server 130. The server 130 is enabled to receive and serve multimedia content and causes the SGS 140 to generate a signature respective of the multimedia content. The process for generating the signatures for multimedia content, is explained in more detail herein below with respect to FIGS. 3 and 4. The various elements of the system 100 as depicted in FIG. 1 are also described in a co-pending U.S. patent application Ser. No. 13/344,400 (hereinafter the '400 application) to Raichelgauz, et al., which is assigned to common assignee, and is incorporated hereby by reference for all that it contains.

It should be noted that each of the server 130 and the SGS 140, typically comprises a processing unit (not shown), such as a processor, a CPU, and the like that is coupled to a memory. The memory contains instructions that can be executed by the processing unit. The server 130 also includes an interface (not shown) to the network 110.

A plurality of web servers 150-1 through **150-*m* are also connected to the network 110, each of which is configured to generate and send online advertisements to the server 130. The web servers 150-1 through 150-*m* typically receive the advertised content from advertising agencies that set the advertising campaign. In one embodiment, the advertisements may be stored in a data warehouse 160 which is connected to the server 130 (either directly or through the network 110**) for further use.

The system 100 may be configured to generate customized channels of multimedia content. Accordingly, a web browser 120 or a client channel manager application (not shown), available on either the server 130, on the web browser 120, or as an independent or plug-in application, may enable a user to create customized channels of multimedia content. Such customized channels of multimedia content are personalized content channels that are generated in response to selections made by a user of the web browser 120 or the client channel manager application. The system 100, and in particular the server 130 in conjunction with the SGS 140, determines which multimedia content is more suitable to be viewed, played or otherwise utilized by the user with respect to a given channel, based on the signatures of selected multimedia content. These channels may optionally be shared with other users, used and/or further developed cooperatively, and/or sold to other users or providers, and so on. The process for defining, generating and customizing the channels of multimedia content are described in greater detail in the co-pending '400 application referenced above.

According to the embodiments disclosed herein, a user visits a web-page using a web-browser 120. When the web-page is uploaded on the user's web-browser 120, the server 130 analyzes the multimedia content elements contained in the web-page. A multimedia content element may include, for example, an image, a graphic, a video stream, a video clip, an audio stream, an audio clip, a video frame, a photograph, and an image of signals (e.g., spectrograms, phasograms, scalograms, etc.), and/or combinations thereof and portions thereof.

It should be noted that the server 130 may analyze all or a sub-set of the multimedia content elements contained in the web-page. The SGS 140 generates for each multimedia content element provided by the server 130 at least one signature. The generated signature(s) may be robust to noise and distribution as discussed below. Then, using the generated signature(s) the server 130 is capable of determining a link to content respective of the signatures. Such links may be extracted from the data warehouse 160. For example, if the signature of an image indicates the city of New York then a link to the municipal website of the city of New York may be determined.

For instance, in order to provide a matching advertisement for a sport car it may be desirable to locate a car of a particular model. However, in most cases the model of the car would not be part of the metadata associated with the multimedia content (image). Moreover, the car shown in an image may be at angles different from the angles of a specific photograph of the car that is available as a search item. The signature generated for that image would enable accurate recognition of the model of the car because the signatures generated for the multimedia content elements, according to the disclosed embodiments, allow for recognition and classification of multimedia elements, such as, content-tracking, video filtering, multimedia taxonomy generation, video fingerprinting, speech-to-text, audio classification, element recognition, video/image search and any other application requiring content-based signatures generation and matching for large content volumes such as, web and other large-scale databases.

In one embodiment, the signatures generated for more than one multimedia content element are clustered. The clustered signatures are used to search for a matching advertisement. The one or more selected matching advertisements are retrieved from the data warehouse 160 and uploaded to the web-page on the web browser 120 by means of one of the web servers 150.

Figure 2:
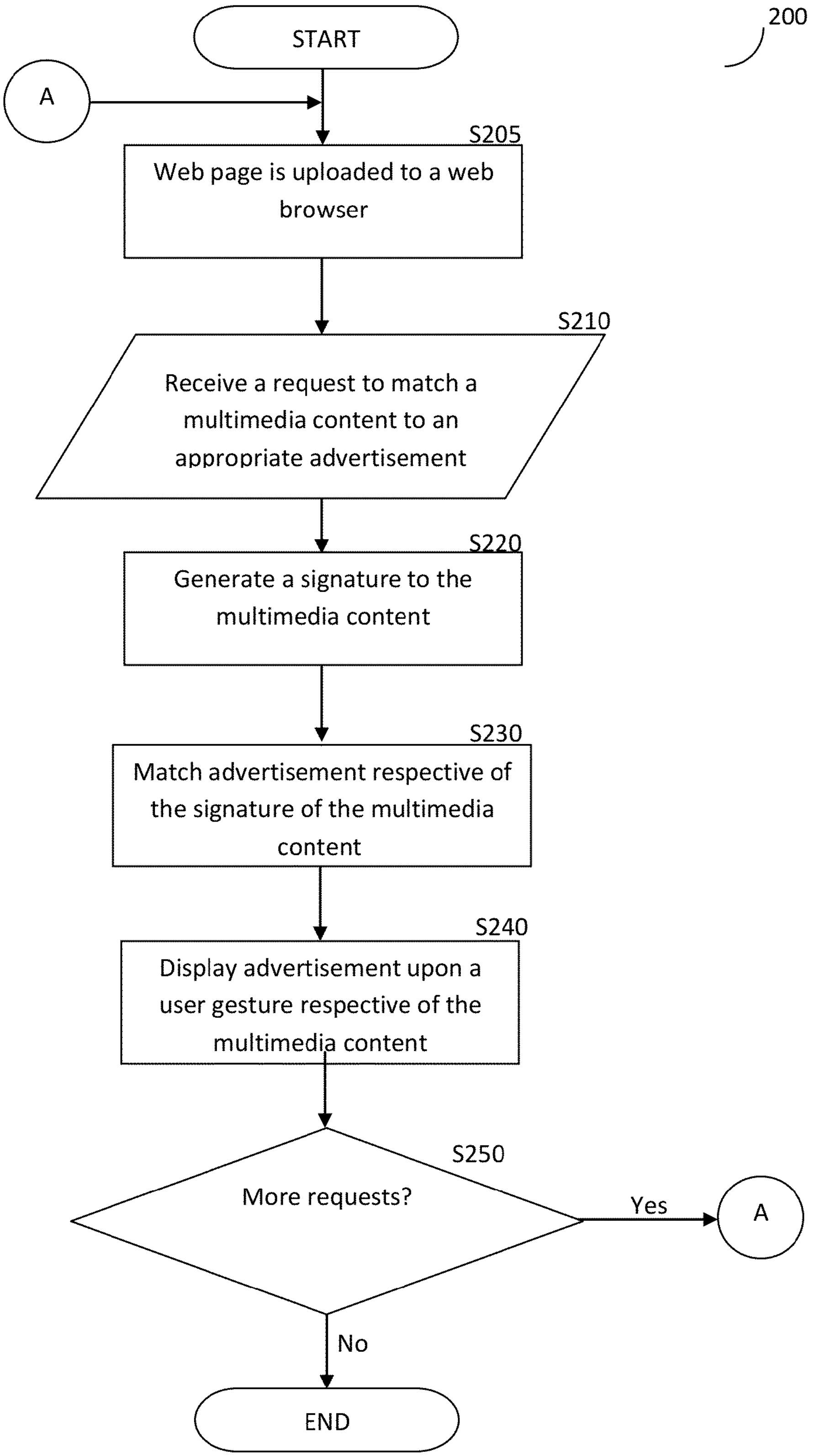
FIG. 2 is a flowchart describing the process of matching an advertisement to multimedia content displayed on a web-page according to an embodiment.

FIG. 2 depicts an exemplary and non-limiting flowchart 200 describing the process of matching an advertisement to multimedia content displayed on a web-page according to an embodiment. At S205, the method starts when a web-page is uploaded to one of the web-browsers (e.g., web-browser 120-1). In S210, a request to match at least one multimedia content element contained in the uploaded web-page to an appropriate advertisement item is received. The request can be received from a web server (e.g., a server 150-1), a script running on the uploaded web-page, or an agent (e.g., an add-on) installed in the web-browser. S210 can also include extracting the multimedia content elements for a signature that should be generated.

In S220, a signature to the multimedia content element is generated. The signature for the multimedia content element generated by a signature generator is described below. In S230, an advertisement item is matched to the multimedia content element respective of its generated signature. In one embodiment, the matching process includes searching for at least one advertisement item respective of the signature of the multimedia content and a display of the at least one advertisement item within the display area of the web-page. In one embodiment, the matching of an advertisement to a multimedia content element can be performed by the computational cores that are part of a large scale matching discussed in detail below.

In S240, upon a user's gesture the advertisement item is uploaded to the web-page and displayed therein. The user's gesture may be: a scroll on the multimedia content element, a press on the multimedia content element, and/or a response to the multimedia content. This ensures that the user attention is given to the advertised content. In S250 it is checked whether there are additional requests to analyze multimedia content elements, and if so, execution continues with S210; otherwise, execution terminates.

As a non-limiting example, a user uploads a web-page that contains an image of a sea shore. The image is then analyzed and a signature is generated respective thereto. Respective of the image signature, an advertisement item (e.g., a banner) is matched to the image, for example, a swimsuit advertisement. Upon detection of a user's gesture, for example, a mouse scrolling over the sea shore image, the swimsuit ad is displayed.

The web-page may contain a number of multimedia content elements; however, in some instances only a few advertisement items may be displayed in the web-page. Accordingly, in one embodiment, the signatures generated for the multimedia content elements are clustered and the cluster of signatures is matched to one or more advertisement items.

Figure 3:
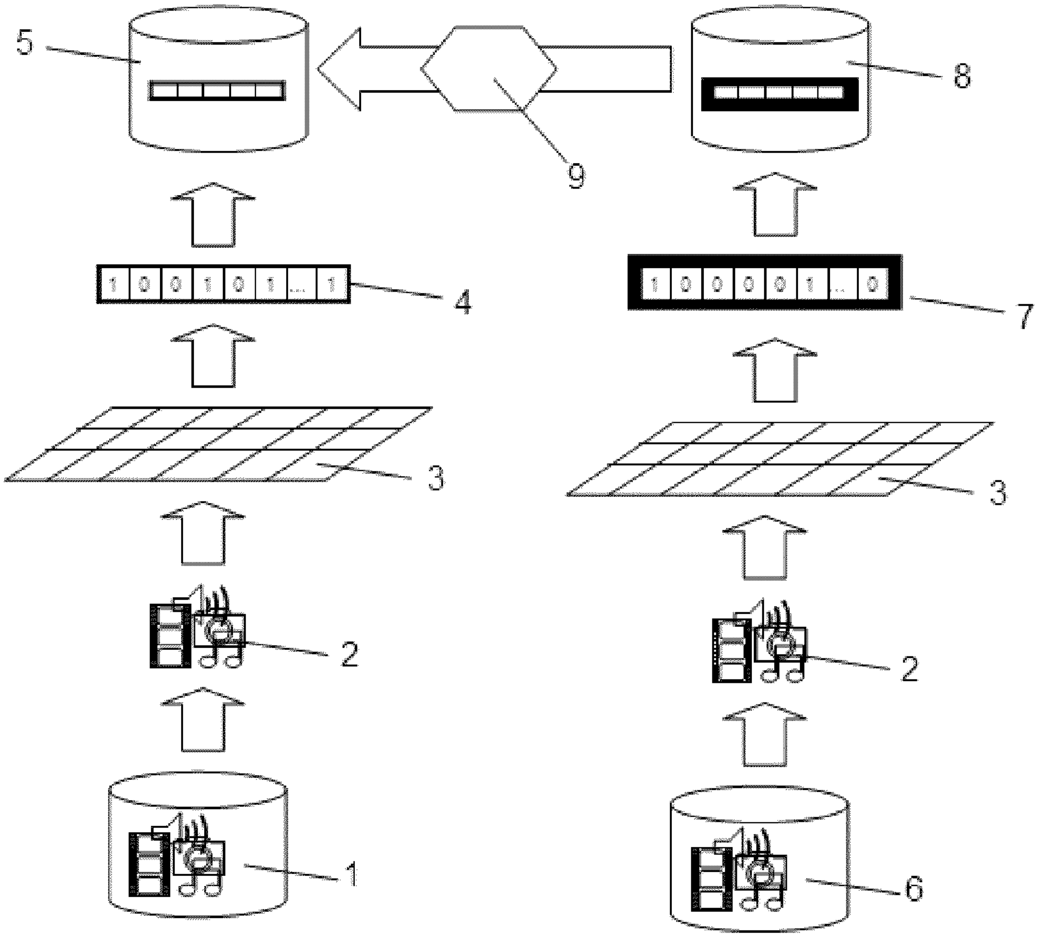
FIG. 3 is a block diagram depicting the basic flow of information in the signature generator system.
Figure 4:
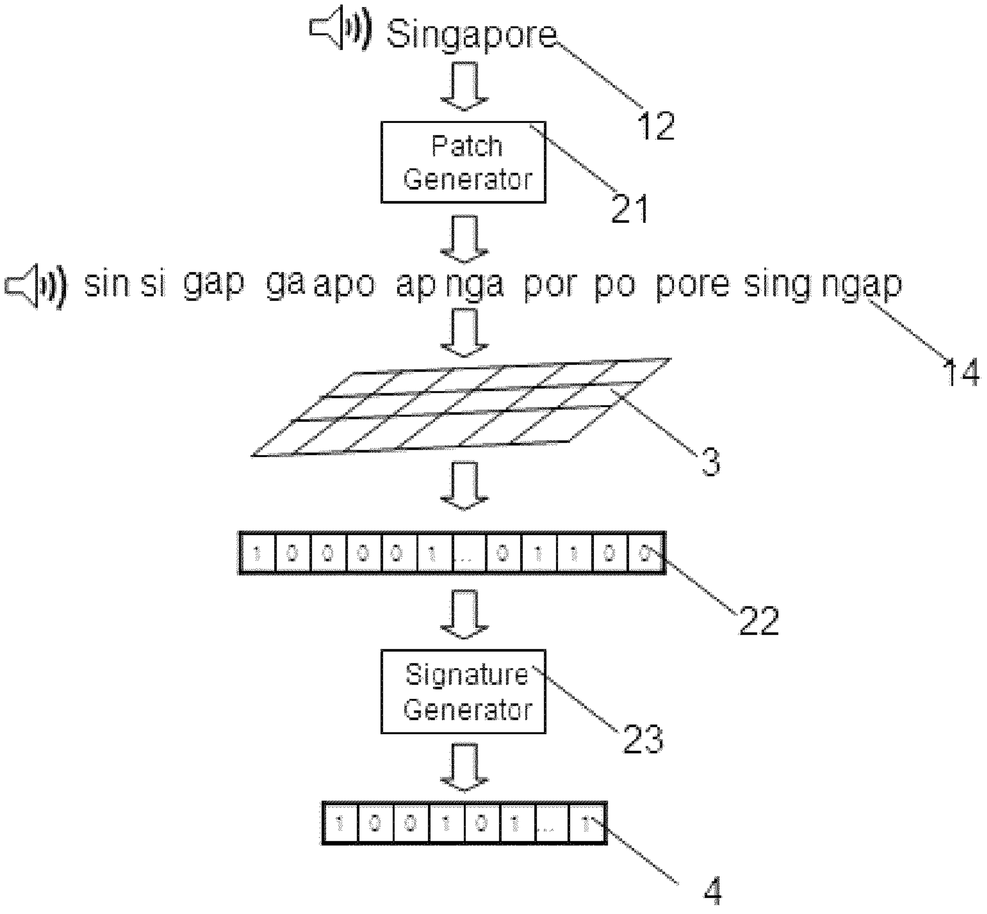
FIG. 4 is a diagram showing the flow of patches generation, response vector generation, and signature generation in a large-scale speech-to-text system.

FIGS. 3 and 4 illustrate the generation of signatures for the multimedia content elements by the SGS 140 according to one embodiment. An exemplary high-level description of the process for large scale matching is depicted in FIG. 3. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Finally, Target Robust Signatures and/or Signatures are effectively matched, by a matching algorithm 9, to Master Robust Signatures and/or Signatures database to find all matches between the two databases.

To demonstrate an example of signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames.

The Signatures' generation process will now be described with reference to FIG. 4. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the server 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame T is injected into all the Cores 3. Then, Cores 3 generate two binary response vectors: $\vec{S}$ which is a Signature vector, and $\overrightarrow{RS}$ which is a Robust Signature vector.

For generation of signatures robust to additive noise, such as White-Gaussian-Noise, scratch, etc., but not robust to distortions, such as crop, shift and rotation, etc., a core $C_i=\{n_i\}$ ($1 \le i \le L$) may consist of a single leaky integrate-to-threshold unit (LTU) node or more nodes. The node $n_i$ equations are:

$$V_i = \sum_j w_{ij} k_j$$

$$n_i = \square(Vi - Th_x)$$

where, $\square$ is a Heaviside step function; $w_{ij}$ is a coupling node unit (CNU) between node i and image component j (for example, grayscale value of a certain pixel j); $k_j$ is an image component 'j' (for example, grayscale value of a certain pixel j); $Th_x$ is a constant Threshold value, where x is 'S' for Signature and 'RS' for Robust Signature; and Vi is a Coupling Node Value.

The Threshold values Thx are set differently for Signature generation and for Robust Signature generation. For example, for a certain distribution of Vi values (for the set of nodes), the thresholds for Signature ($Th_S$) and Robust Signature ($Th_{RS}$) are set apart, after optimization, according to at least one or more of the following criteria:

1: For:

$$V_i > Th_{RS}$$

$$1-p(V>Th_S)-1-(1-\epsilon)^l \ll 1$$

i.e., given that l nodes (cores) constitute a Robust Signature of a certain image l, the probability that not all of these l nodes will belong to the Signature of same, but noisy image, $\tilde{\square}$ is sufficiently low (according to a system's specified accuracy).

2:

$$p(V_l > Th_{RS}) \approx l/L$$

i.e., approximately l out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed descriptions of the Signature generation is discussed in more detail in the co-pending patent applications of which this patent application is a continuation-in-part, and are hereby incorporated by reference.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

Figure 5:
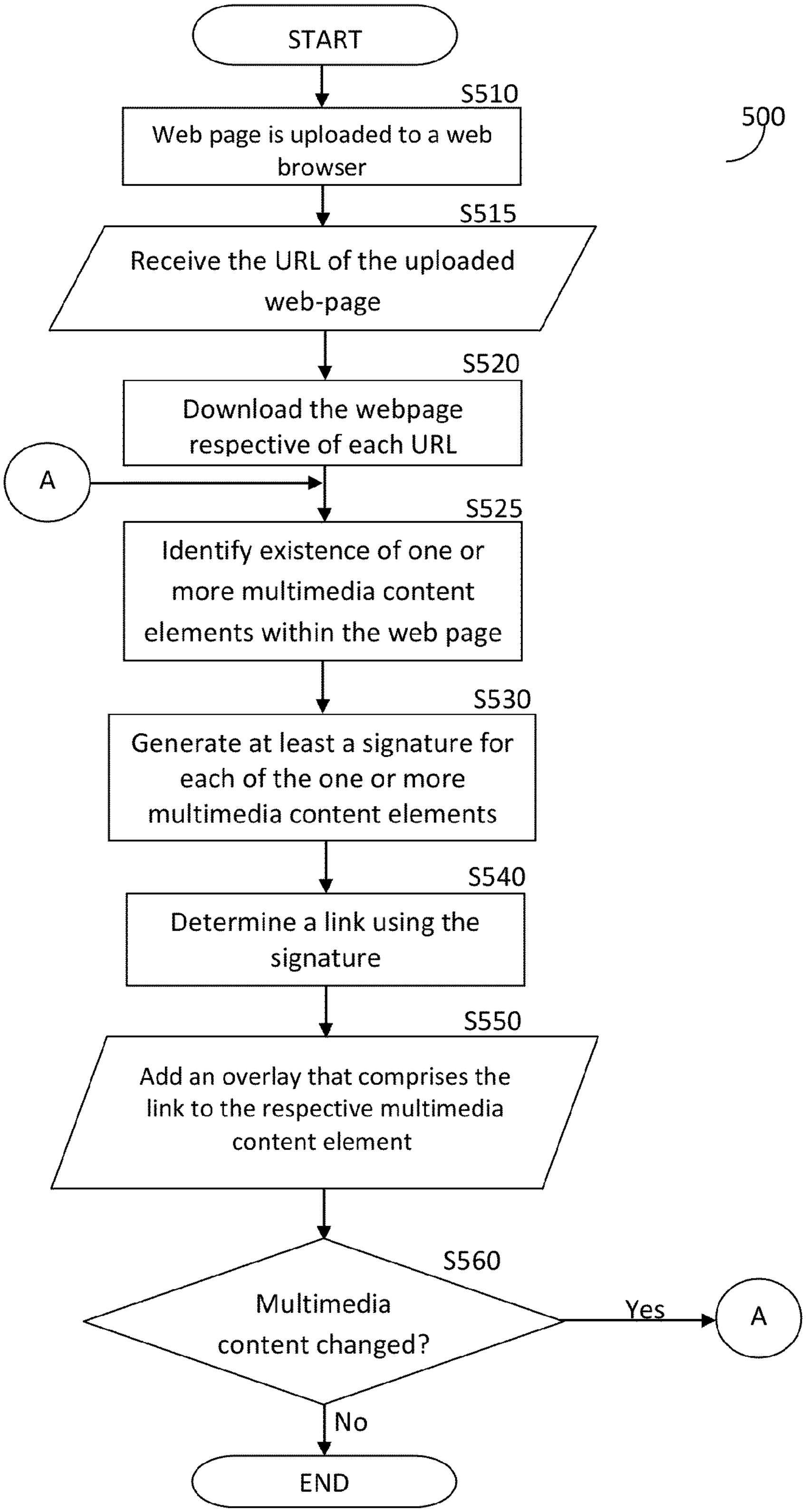
FIG. 5 is a flowchart describing a process for adding a link to multimedia content displayed on a web-page according to an embodiment.

FIG. 5 depicts an exemplary and non-limiting flowchart 500 describing the process of adding an overlay to multimedia content displayed on a web-page according to an embodiment. In S510, the method starts when a web-page is uploaded to a web-browser (e.g., web-browser 120-1). In another embodiment, the method starts when a web-server (e.g., web-server 150-1) receives a request to host the requested web-page. In S515, the server 130 receives the uniform resource locator (URL) of the uploaded web-page. In another embodiment, the uploaded web-page includes an embedded script. The script extracts the URL of the web-page, and sends the URL to the server 130. In another embodiment, an add-on installed in the web-browser 120 extracts the URL of the uploaded web-page, and sends the URL to the server 130. In yet another embodiment, an agent is installed on a user device executing the web browser 120. The agent is configured to monitor web-pages uploaded to the web-site, extract the URLs, and send them to the server 130. In another embodiment, a web-server (e.g., server 150) hosting the requested web-page, provides the server 130 with the URL of the requested web-page. It should be noted only URLs of selected web sites can be sent to the server 130, for example, URLs related to web-sites that paid for the additional information.

In S520, the server downloads the web-page respective of each received URL. In S525, the server 130 analyzes the web-page in order to identify the existence of at least one or more multimedia content elements in the uploaded web-page. It should be understood that a multimedia content, such as an image or a video, may include a plurality of multimedia content elements. In S530, the SGS 140 generates for each multimedia content element identified by the server 130, at least one signature. The signatures for the multimedia elements are generated as described in greater detail above.

In S540, respective of each signature, the server 130 determines one or more links to content that exists on a web server, for example, each of the web servers 150-1 through **150-*m* that can be associated with the multimedia element. A link may be a hyperlink, a URL, and the like. The content accessed through the link may be, for example, informative web-pages such as Wikipedia® website. The determination of the link may be made by identification of the context of the signatures generated by the server 130. For example, if a multimedia content element was identified as a football player, a signature is generated respective thereto, and a link to a sport website that contains information about the football player is determined. In S550, the determined link to the content is added as an overlay to the web-page by the server 130**, respective of the corresponding multimedia content element. According to one embodiment, a link that contains the overlay may be provided to a web browser respective of a user's gesture. A user's gesture may be: a scroll on the multimedia content element, a click on the at least one multimedia content element, and/or a response to the at least one multimedia content or portion thereof.

The modified web-page that includes at least one multimedia element with the added link can be sent directly to the web browser (e.g., browser 120-1) requesting the web-page. This requires establishing a data session between the server 130 and the web browsers 120. In another embodiment, the multimedia element including the added link is returned to a web server (e.g., server 150-1) hosting the requested web-page. The web server (e.g., server 150-1) returns the requested web-page with the multimedia element containing the added link to the web browser (e.g., browser 120-1) requesting the web-page. Once the "modified" web page is displayed over the web browser, a detected user's gesture over the multimedia element would cause the browser to upload the content (e.g., a Wikipedia web page) addressed by the link added to the multimedia element.

In S560, it is checked whether the one or more multimedia content elements contained in the web-page has changed, and if so, execution continues with S525; otherwise, execution terminates.

As a non-limiting example, a web-page related to cinema is uploaded and an image of the movie "Pretty Woman" is identified within the web-page by the server 130. A signature is generated by the SGS 140 respective of the actor Richard Gere and the actress Julia Roberts, both shown in the image. A link to Richard Gere's biography and Julia Roberts' biography on the Wikipedia® website is then determined respective of the signatures and the context of the signatures as further described herein above. The context of the signatures according to this example may be "American Movie Actors". An overlay containing the links to Richard Gere's biography and Julia Roberts' biography on the Wikipedia® website is added over the image such that upon detection of a user's gesture, for example, a mouse clicking over the part of the image where Richard Gere is shown, the link to Richard Gere's biography on Wikipedia® is provided to the user.

According to another embodiment, a web-page that contains an embedded video clip is requested by a web browser 120-1 from a web server 150-1. The server 130 receives the requested URL. The server 130 analyzes the video content within the requested web-page and a signature is generated by the SGS 140 respective of the entertainer Madonna that is shown in the video content. A link to Madonna's official web-page hosted on a web-server **150-*n* is then determined respective of the signature as further described herein above. An overlay containing the link to Madonna's official web-page is then added over the video content. The web-page together with the link to Madonna's official web-page is then sent to the web server 150-1, which then uploads the requested web-page with the modified video element to the web-browser 120-1**.

The web-page may contain a number of multimedia content elements; however, in some instances only a few links may be displayed in the web-page. Accordingly, in one embodiment, the signatures generated for the multimedia content elements are clustered and the cluster of signatures is matched to one or more advertisement items.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for associating at least one link to an information resource with a multimedia content element, comprising:

identifying at least one multimedia content element in a web-page, wherein a uniform resource locator (URL) of the web-page is received from any one of a user device and a web server hosting the web-page displayed over the user device;

generating, by a signature generator system, a signature for at least a portion of the at least one identified multimedia content element, the signature generator system includes a plurality of computational cores enabled to receive the multimedia content element and to generate a signature for at least a portion of the multimedia content element, each computational core of the plurality of computational cores having properties that are at least partly statistically independent of other of the computational cores, wherein the properties of each core are set independently of each other core;

determining at least one link to a source of information respective of the generated signature; and providing the web-page displayed over the user device with the at least one link to the source of information.

2. The method of claim 1, wherein content addressed by the at least one link is displayed when a gesture of a user is detected on the user device.

3. The method of claim 2, wherein the user gesture is any one of: a scroll on the at least one multimedia content element, a click on the at least one multimedia content element, a response to the at least one multimedia content element.

4. The method of claim 1, further comprising:

determining the context of the multimedia content element respective of the generated signature; and determining the at least one link based on the context of the multimedia content element respective of the generated signature.

5. The method of claim 1, wherein the multimedia content element is at least one of: an image, graphics, a video stream, a video clip, an audio stream, an audio clip, a video frame, a photograph, images of signals, combinations thereof, and portions thereof.

6. The method of claim 4, wherein the at least one link is added to the multimedia content element as an overlay object.

7. A non-transitory computer readable medium having stored thereon instructions for causing one or more processing units to execute the method according to claim 1.

8. A system for associating at least one link to an information resource with a multimedia content element from at least one web-page containing at least one multimedia content element, comprising:

an interface to a network for receiving the at least one web-page containing at least one multimedia content element, wherein a uniform resource locator (URL) of the at least one web-page is received from any one of a user device and a web server hosting the at least one web-page displayed over the user device;

a signature generator system for generating signatures for the at least one multimedia content element or a portion thereof;

a plurality of computational cores enabled to receive the multimedia content element and to generate a signature for at least a portion of the multimedia content element, each computational core of the plurality of computational cores having properties that are at least partly statistically independent of other of the computational cores, wherein the properties of each core are set independently of each other core;

a processor; and a memory coupled to the processor, the memory contains instructions that when executed by the processor cause the system to:

identify the at least one multimedia content element in the at least one web-page;

generate a signature for at least a portion of the at least one identified multimedia content element;

determine at least one link to a source of information respective of the generated signature; and provide the at least one web-page displayed over the user device with the at least one link to the source of information.

9. The system of claim 8, wherein the system is further configured to display content addressed by the provided at least one link upon detection of a user's gesture.

10. The system of claim 9, wherein the user gesture is any one of: a scroll on the at least one multimedia content, a press on the at least one multimedia content or a portion thereof, and a response to the at least one multimedia content.

11. The system of claim 8 wherein the system is further configured to:

cluster signatures generated for each of the at least one multimedia content element; and search for at least one link of an information resource in the database matching the cluster of signatures.

12. The system of claim 8, wherein the at least one multimedia content element is at least one of: an image, graphics, a video stream, a video clip, an audio stream, an audio clip, a video frame, a photograph, and images of signals.

13. The system of claim 8, wherein the processor is further configured to:

determine a context of the at least one multimedia content element respective of the signature.

14. The system of claim 13, wherein the processor is further configured to:

determine the context of the multimedia content element respective of the generated signature; and determine the at least one link based on the context of the at least one multimedia content element respective of the generated signature.

* * * * *